(No Model.)
T. HILL.
METALLIC WHEEL.
No. 399,989. Patented Mar. 19, 1889.
Fig. I.
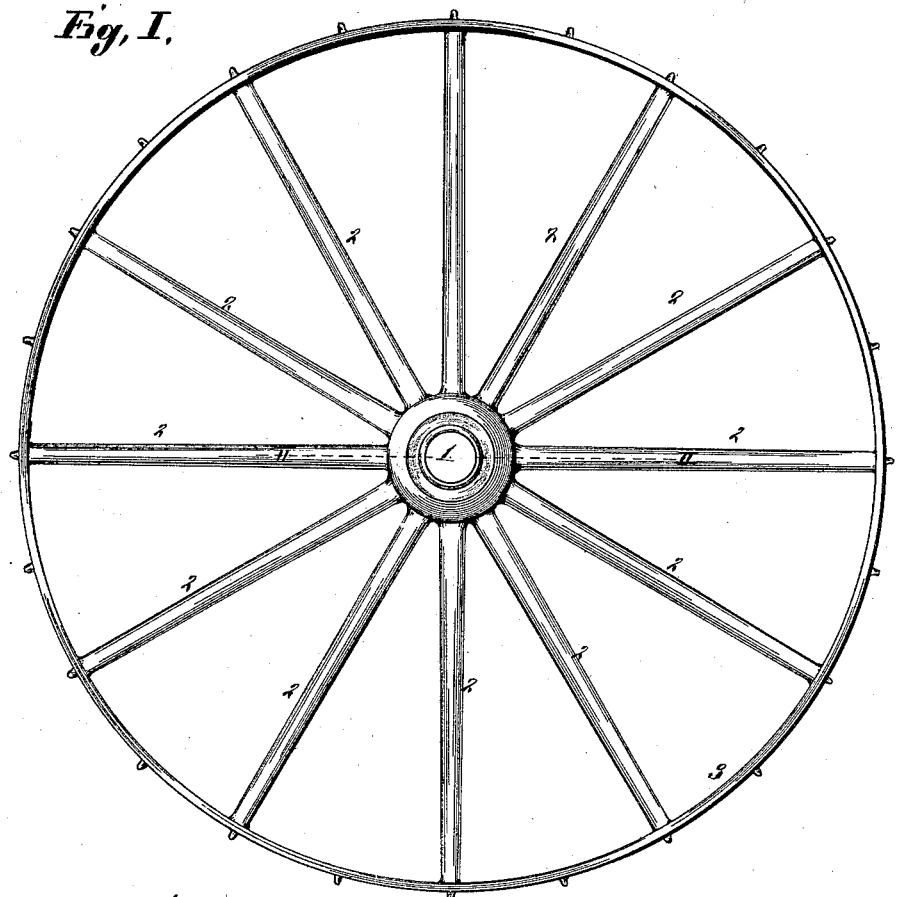
Fig. II.
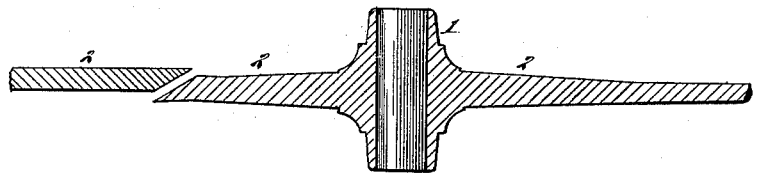
Attest:
E. Arthur.
Edward Stur.
Inventor:
Thomas Hill
By Knight Bros
Attys

UNITED STATES PATENT OFFICE.

THOMAS HILL, OF QUINCY, ILLINOIS.

METALLIC WHEEL.

SPECIFICATION forming part of Letters Patent No. 399,989, dated March 19, 1889.

Application filed June 12, 1888. Serial No. 276,796. (No model.)

*To all whom it may concern:*

Be it known that I, THOMAS HILL, of Quincy, in the county of Adams and State of Illinois, have invented a certain new and useful Improvement in Metal Wheels, of which the following is a full, clear, and exact description, reference being had to the accompanying drawings, forming part of this specification, and in which—

Figure I is a side elevation of my improved wheel. Fig. II is a detail section through the hub and two of the spokes, this section being taken on line II II, Fig. I.

My invention relates to an improved metal wheel; and my invention consists in features of novelty hereinafter fully described, and pointed out in the claims.

Referring to the drawings, 1 represents the hub of the wheel, 2 the arms or spokes, and 3 the rim. The hub and the inner ends of the arms or spokes are cast integral or in one piece of metal that will take a weld, the length of spoke cast upon the hub being that shown in the left-hand side of Fig. II, more or less. When the hub and this portion of the spoke are thus cast, the outer ends of the spokes are welded to the inner ends, forming a complete union and making the spokes virtually one from end to end.

I am aware that it is old to make metal wheels with the hub and spokes the entire length cast integral. To this there are many objections, one of which is the vast amount of room required in the foundry to manufacture such wheels to any great extent, as the molds require a large amount of space.

I am also aware that it is old to secure wrought spokes (of one piece each throughout their length) to cast hubs; but there are objections to this method when applied to a certain class of wheels, in that they cannot be made sufficiently strong without setting them zigzag, (or out of line in the hub.) Hay-rake wheels when thus made are unsatisfactory, for the reason that the spokes (being placed zigzag at the hub) gather the hay and become clogged, which is not the case when the spokes are set in line around the hub.

With my improved wheel the spokes may be set in line around the hub, having the advantage of being cast in one part with the hub, and unnecessary space, or a large amount of space, is not required in casting the hubs and the parts of the arms integral.

The rim 3 is secured to the spokes after the outer ends have been welded to the inner ends, and the connection is made by any desirable welding method.

I claim as my invention—

As a new article of manufacture, a metal wheel having the hub and the inner ends of the arms or spokes cast integral and the outer ends of the arms or spokes welded to the inner ends, substantially as and for the purpose set forth.

THOS. HILL.

In presence of—
   F. M. McCANN,
   J. W. SINNOCK.